C. ANDERSEN.
Filter.

No. 161,194. Patented March 23, 1875.

Witnesses.

Inventor.
Christian Andersen
pr
Van Santvoord & Stauff
Attys

UNITED STATES PATENT OFFICE.

CHRISTIAN ANDERSEN, OF BROOKLYN, NEW YORK.

IMPROVEMENT IN FILTERS.

Specification forming part of Letters Patent No. 161,194, dated March 23, 1875; application filed September 21, 1874.

*To all whom it may concern:*

Be it known that I, CHRISTIAN ANDERSEN, of Brooklyn, in the county of Kings and State of New York, have invented a certain new and Improved Filter, of which the following is a specification:

This invention relates to that class of filters which are composed of a closed vessel containing an agitator, and provided with a supply and with a discharge pipe. My invention consists in arranging, upon a filtering-vessel containing an agitator, a dome, in which is arranged a sieve or strainer, said sieve or strainer operating in connection with the discharge-pipe, in such a manner that any floating particles of the filtering material present in the liquid will be prevented by the strainer from flowing out of the vessel into and through the discharge-pipe.

This invention is illustrated in the accompanying drawing, in which—

Figure 1:
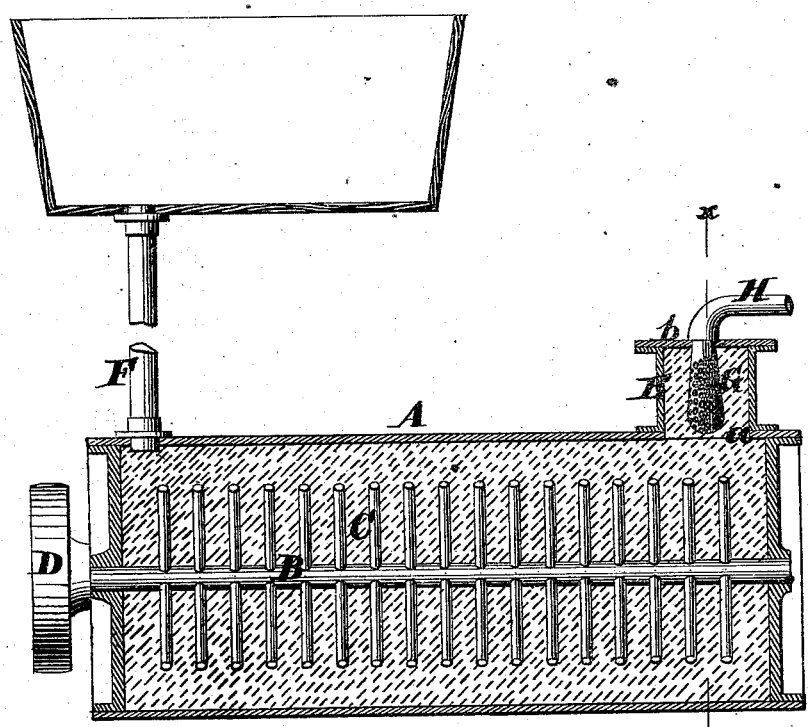
Figure 2:
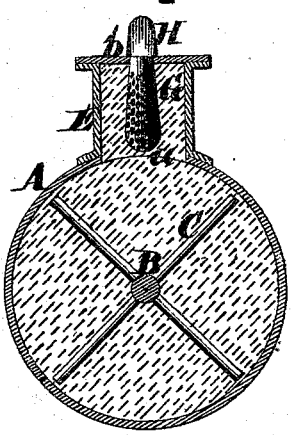

Figure 1 represents a longitudinal vertical section. Fig. 2 is a transverse section in the plane $x\ x$, Fig. 1.

Similar letters indicate corresponding parts.

In these drawings, the letter A designates my filtering-vessel, which is made of iron or any other suitable material, closed on all sides, and in the form of a cylinder, or in any other shape suitable for my purpose. The heads of this vessel form the bearings for a shaft, B, which is provided with radiating arms, forming an agitator, C, and one end of which extends through the head of the vessel A, for the purpose of applying thereto a pulley, D, by means of which the agitator can be set in motion. In the side of the vessel A, near one of its ends, is an aperture, $a$, which leads into a dome, E, that rises from the vessel A, and is provided with a lid or cover, $b$. By raising this cover access can be had to the interior of the vessel A, and through this dome said vessel is charged with bone-black or other filtering material. The liquid to be filtered is introduced through a pipe, F, which connects with a supply tank or vessel situated at a suitable elevation above the vessel A, so that the liquid passes through this vessel under a certain head or pressure, or forced in by aid of a pump. The filtered liquid discharges through a sieve or strainer, G, which is inclosed in the dome E, and connects with the discharge-pipe H.

The operation of my filter is as follows: The filtering material is dumped into the vessel A through the dome E, and, after the cover of this dome has been replaced and closed tight, the liquid to be filtered is let on and the agitator C is set in motion. By this agitator the liquid is brought into intimate contact with the filtering material, and, as it rises into the dome E and reaches the strainer G, said liquid is freed from its impurities, which are retained by the filtering material. The filtering material which rises with the liquid into the dome E is prevented by the strainer from flowing out, and the clear liquid passes off through the discharge-pipe H.

What I claim as new, and desire to secure by Letters Patent, is—

In combination with a filtering-vessel having an agitator, as described, a dome, E, rising from such vessel, for receiving the strainer G of the discharge-pipe, and for supplying the vessel with filtering material, substantially as described.

In testimony that I claim the foregoing I have hereunto set my hand this 11th day of September, 1874.

CHRISTIAN ANDERSEN.

Witnesses:
W. HAUFF,
E. F. KASTENHUBER.